US010714937B2

(12) United States Patent
Ebata et al.

(10) Patent No.: US 10,714,937 B2
(45) Date of Patent: Jul. 14, 2020

(54) VOLTAGE REACTIVE POWER CONTROL DEVICE AND VOLTAGE REACTIVE POWER CONTROL METHOD

(71) Applicants: KABUSHIKI KAISHA TOSHIBA, Minato-ku (JP); TOSHIBA ENERGY SYSTEMS & SOLUTIONS CORPORATION, Kawasaki-shi (JP)

(72) Inventors: Yoshio Ebata, Ota-ku (JP); Takenori Kobayashi, Meguro (JP); Yoko Kosaka, Nakano (JP); Tsutomu Tanno, Fuchu (JP); Mami Mizutani, Hachioji (JP); Masako Kiuchi, Fuchu (JP)

(73) Assignees: KABUSHIKI KAISHA TOSHIBA, Minato-ku (JP); TOSHIBA ENERGY SYSTEMS & SOLUTIONS CORPORATION, Kawasaki-shi (JP)

( * ) Notice: Subject to any disclaimer, the term of this patent is extended or adjusted under 35 U.S.C. 154(b) by 158 days.

(21) Appl. No.: 16/081,537

(22) PCT Filed: Mar. 4, 2016

(86) PCT No.: PCT/JP2016/056808
§ 371 (c)(1),
(2) Date: Aug. 31, 2018

(87) PCT Pub. No.: WO2017/149762
PCT Pub. Date: Sep. 8, 2017

(65) Prior Publication Data
US 2020/0044451 A1 Feb. 6, 2020

(51) Int. Cl.
*H02J 3/16* (2006.01)
*H02J 3/18* (2006.01)
(Continued)

(52) U.S. Cl.
CPC .............. *H02J 3/16* (2013.01); *H02J 3/1878* (2013.01); *H02J 3/24* (2013.01); *H02J 3/32* (2013.01);
(Continued)

(58) Field of Classification Search
CPC ...... G05F 1/67; G05F 1/70; H02J 3/16; H02J 3/1878; H02J 3/24; H02J 3/32; H02J 3/38
See application file for complete search history.

(56) References Cited

U.S. PATENT DOCUMENTS

2009/0001942 A1* 1/2009 Temma .................. G05F 1/70
323/211
2012/0038212 A1* 2/2012 Arata ...................... H02J 3/32
307/46
(Continued)

FOREIGN PATENT DOCUMENTS

JP         8-308104 A      11/1996
JP      2011-211774 A      10/2011

OTHER PUBLICATIONS

International Search Report dated May 24, 2016 in PCT/JP2016/056808 filed Mar. 4, 2016.
(Continued)

*Primary Examiner* — Yusef A Ahmed
(74) *Attorney, Agent, or Firm* — Oblon, McClelland, Maier & Neustadt, L.L.P.

(57) ABSTRACT

A voltage reactive power control device includes a bus voltage fluctuation extracting unit that extracts a bus voltage fluctuation from a voltage of a secondary-side bus, an RE component extracting unit that extracts a fluctuation component due to renewable energy power generation from the bus voltage fluctuation, a creating unit that creates a reactive power command value for suppressing the fluctuation component based on the bus voltage fluctuation component due to the renewable energy power generation extracted by the
(Continued)

RE component extracting unit, and a control unit that executes the reactive power control on a battery system based on the reactive power command value. The RE component extracting unit extracts the fluctuation component due to the renewable energy power generation by eliminating the fluctuation components other than the fluctuation component due to the renewable energy power generation from the bus voltage fluctuation.

11 Claims, 3 Drawing Sheets

(51) Int. Cl.
- *H02J 3/24* (2006.01)
- *H02J 3/32* (2006.01)
- *H02J 3/38* (2006.01)
- *H02J 7/35* (2006.01)
- *G05F 1/70* (2006.01)

(52) U.S. Cl.
CPC .............. *H02J 3/383* (2013.01); *H02J 3/386* (2013.01); *G05F 1/70* (2013.01); *H02J 7/35* (2013.01)

(56) References Cited

U.S. PATENT DOCUMENTS

| | | | | |
|---|---|---|---|---|
| 2012/0229093 A1* | 9/2012 | Sakai | .................. | H02J 7/35 320/134 |
| 2013/0106188 A1* | 5/2013 | Ishibashi | .................. | H02J 3/382 307/46 |
| 2013/0214536 A1* | 8/2013 | Wakasa | .................. | H02J 3/386 290/44 |
| 2013/0234521 A1* | 9/2013 | Eom | .................. | H02J 3/16 307/66 |
| 2013/0328309 A1* | 12/2013 | Fujii | .................. | F03D 7/0272 290/44 |
| 2015/0077068 A1* | 3/2015 | Naoi | .................. | H02J 3/28 323/205 |
| 2015/0357820 A1* | 12/2015 | Sugimoto | .................. | H01M 8/04544 307/52 |
| 2016/0028301 A1* | 1/2016 | Murakami | .................. | H02J 3/01 363/41 |
| 2018/0152020 A1* | 5/2018 | Kuroda | .................. | H02J 3/00 |
| 2018/0248373 A1* | 8/2018 | Monden | .................. | H02M 7/44 |
| 2019/0052079 A1* | 2/2019 | Kubota | .................. | G05B 19/042 |
| 2019/0052083 A1* | 2/2019 | Lucas, Jr. | .................. | H02J 3/46 |
| 2019/0135117 A1* | 5/2019 | Kunomura | .................. | B60L 9/24 |
| 2019/0148977 A1* | 5/2019 | Kuroda | .................. | H02J 3/00 700/286 |
| 2019/0296551 A1* | 9/2019 | Kawachi | .................. | G05F 1/70 |

OTHER PUBLICATIONS

Noriyuki Uchiyama, et al. "Reactive Power Control Method for Reducing Voltage Fluctuation in Large-scale Photovoltaic Systems", IEEJ Transactions on Power and Energy, 2010, vol. 130, No. 3 (14 total pages, with English Translation).

* cited by examiner

VOLTAGE REACTIVE POWER CONTROL DEVICE AND VOLTAGE REACTIVE POWER CONTROL METHOD

FIELD

Embodiments of the present disclosure relate to a voltage reactive power control device and a voltage reactive power control program.

BACKGROUND

A power distribution system interconnected to a power distribution transformer station employs a structure spreading dendritically to system terminals from the transformer station, and includes a plurality of consumers, such as houses, business facilities, and factories, that is, loads. Since the power consumption amounts by the consumers change from hour to hour and the number of consumers is large, the voltage of the bus of the power distribution transformer station interconnected to the power distribution system changes. In order to suppress fluctuation of the bus voltage of the power distribution transformer station due to this load change, conventionally, voltage adjusting devices, such as a transformer that can be tap switched, and phase adjusting facilities are provided to said transformer station.

Meanwhile, in recent years, introduction of renewable energy is advancing actively to cope with global environmental issues and to ensure a stable supply by the diversification of energy sources, and the introduction of distributed power supplies, such as solar power generation and wind power generation, to the power system is increasing steadily. These distributed power supplies are mainly interconnected to a power distribution system.

CITATION LIST

Non-Patent Literatures

Non-patent Document 1: Noriyuki UCHIYAMA and other three authors, "Reactive Power Control Method for Reducing Voltage Fluctuation in Large-scale Photovoltaic Systems", IEEJ Transactions on Power and Energy, 2010, vol. 130, No. 3, p. 297 to p. 304

SUMMARY

Since the renewable energy power generation, such as solar power generation and wind power generation, has an amount of generated power that varies depending on a natural environment, such as the amount of solar light and the wind direction, the output is likely to be unstable. Hence, when a large number of renewable energy power generations, such as a solar power generation and a wind power generation, is interconnected to the bus of the power distribution transformer station, the bus voltage fluctuation increases, possibly affecting the stable operation of the power system. In particular, it is expected that the renewable energy power generations, such as a solar power generation and a wind power generation, are to be introduced in a large amount, a countermeasure of suppressing a bus voltage of the power distribution transformer station is desired.

In this point, the bus voltage fluctuation by the output fluctuation of the renewable energy power generation may be suppressed by the reactive power control of a conventional voltage adjusting device. However, since the conventional voltage adjusting device is for mainly suppressing a bus voltage fluctuation due to a load change as described above making the control complicated, and since there is also a desire to apply the conventional technology as it is, this scheme is not practical.

What is also considered is to comprehensively control reactive power to be output by a plurality of solar power generations (PVs) distributed in the power distribution system using communications, to address a bus voltage fluctuation due to output fluctuation of the PVs. However, it is necessary to install communication means to all PVs distributed in the power distribution system, and since the PVs may be located widespread in various areas, the introduction of this scheme is not easy in view of costs and labors. Moreover, since it is necessary to individually control the distributed PV, the control is likely to be complicated.

A voltage reactive power control device and a voltage reactive power control program according to an embodiment have been made in order to address the foregoing technical problems, and an objective is to provide a voltage reactive power control device and a voltage reactive power control program capable of suppressing a bus voltage fluctuation of a power distribution transformer station due to an output fluctuation of a renewable energy power generation by a simple control that utilizes a battery, while achieving a cooperative action with already-existing facilities.

In order to achieve the above objective, a voltage reactive power control device suppresses a fluctuation of a bus voltage of a power distribution transformer station to which a power distribution system including a renewable energy power generation, and a battery system are connected, and the voltage reactive power control device includes:

a first extracting unit that extracts the bus voltage fluctuation from of the bus voltage;

a second extracting unit that extracts a fluctuation component due to the renewable energy power generation from bus voltage fluctuation;

a creating unit that creates a reactive power command value for suppressing the fluctuation based on the bus voltage fluctuation component due to the renewable energy power generation extracted by the second extracting unit; and a control unit that executes a reactive power control on the battery system based on the reactive power command value, in which the second extracting unit extracts the fluctuation component due to the renewable energy power generation by eliminating the fluctuation components other than the fluctuation component due to the renewable energy power generation from the bus voltage fluctuation.

A voltage reactive power control program according to an embodiment is to suppress a fluctuation of a bus voltage of a power distribution transformer station to which a power distribution system including a renewable energy power generation, and a battery system are connected, and the voltage reactive power control program causes a computer to execute:

a first extracting process of extracting a bus voltage fluctuation from a the bus voltage;

a second extracting process of extracting a fluctuation component due to the renewable energy power generation from the bus voltage fluctuation;

a creating process of creating a reactive power command value for suppressing the fluctuation component based on the bus voltage fluctuation component due to the renewable energy power generation extracted by the second extracting process; and a control process of executing a reactive power control on the battery system based on the reactive power command value, in which the second extracting process includes:

a transformer component eliminating process of eliminating a bus voltage fluctuation component due to a tap control on a transformer provided in the power distribution transformer station from the input bus voltage fluctuation;

a phase-adjusting-facilities component eliminating process of eliminating a bus voltage fluctuation component due to an operation of phase adjusting facilities provided in the power distribution transformer station from the input bus voltage fluctuation;

a power-distribution-system-load component eliminating process of eliminating a bus voltage fluctuation component due to a load change in the power distribution system from the input bus voltage fluctuation;

a higher-system component eliminating process of eliminating a bus voltage fluctuation component due to a demand-and-supply change of a higher-system connected to the power distribution transformer station from the input bus voltage fluctuation; and a battery component eliminating process of eliminating a bus voltage fluctuation component due to a control on the battery system from the input bus voltage fluctuation.

DETAILED DESCRIPTION

1. First Embodiment

A voltage reactive power control device and a voltage reactive power control system according to this embodiment will be described below with reference to FIGS. 1 to 4.

[1-1. Structure]

Figure 1:
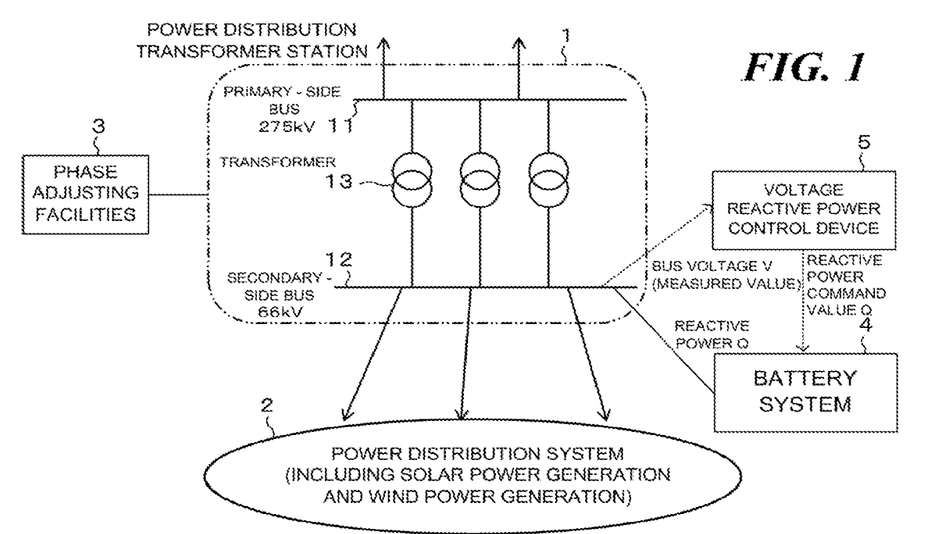
FIG. 1 is a structural diagram of an entire voltage reactive power control system to which a voltage reactive power control device according to a first embodiment is applied.

FIG. 1 is a structural diagram of an entire voltage reactive power control system to which a voltage reactive power control device according to this embodiment is applied.

As illustrated in FIG. 1, a voltage reactive power control system includes a power distribution transformer station 1, a power distribution system 2 connected to the power distribution transformer station 1, phase adjusting facilities 3 provided in the power distribution transformer station 1, a battery system 4 connected to the power distribution transformer station 1, and a voltage reactive power control device 5.

The power distribution transformer station 1 includes a primary-side bus 11, a secondary-side bus 12, and a plurality of transformers 13 provided in parallel between the primary-side bus 11 and the secondary-side bus 12. A higher system such as an extra-high voltage system is connected to the primary-side bus 11. The power distribution system 2 and the battery system 4 are interconnected to the secondary-side bus 12. The transformer 13 is a transformer that can be tap changed, is connected to a control device (unillustrated) that controls the tap of the transformer 13, and the tap of the transformer 13 is controlled by the control device to adjust voltage fluctuations of the bus 11 and 12 by changing a winding ratio.

The power distribution system 2 is interconnected to loads and a plurality of renewable energy power generations. The renewable energy power generations (also referred to as simply RE below) include natural energy power generations, such as solar power generation and wind power generation.

The phase adjusting facilities 3 are a voltage adjusting device that includes a capacitor and a shunt reactor, etc., and is connected to the secondary-side bus 12 in this example. The phase adjusting facilities 3 are provided with a control device (unillustrated) of the phase adjusting facilities 3, and the phase adjusting facilities 3 is controlled by the control device to adjust the voltage of the secondary-side bus 12 by generating the reactive power and applying the reactive power to the secondary-side bus 12. Moreover, the phase adjusting facilities 3 may include, in addition to the capacitor and the reactor, a rotary capacitor (synchronous phase modifier), etc.

The transformer 13, the control device that controls the tap of the transformer 13, the phase adjusting facilities 3, and the control device thereof are already-existing voltage adjusting devices conventionally provided at the transformer station.

The battery system 4 applies or absorbs the reactive power relative to the secondary-side bus 12, and includes a plurality of batteries, an AC and DC converter that converts DC and AC, and a control device of the AC and DC converter. The battery system 4 is connected to the voltage reactive power control device 5, and suppresses a voltage fluctuation of the secondary-side bus 12 by applying or absorbing the reactive power relative to the secondary-side bus 12 in response to a command from the voltage reactive power control device 5.

The voltage reactive power control device 5 is a device to suppress a bus voltage fluctuation due to the output fluctuation of the renewable energy power generations among the bus bar voltage fluctuation of the power distribution transformer station 1. In this embodiment, the description will be given of an example case in which the voltage fluctuation of the secondary-side bus 12 is suppressed.

The voltage reactive power control device 5 includes, for example, a single computer or a plurality of computers connected via a network, and a display device. The voltage reactive power control device 5 stores a program in a recording medium, such as an HDD or an SSD, develops the program in a RAM as appropriate, and executes the developed program by a CPU, to execute necessary arithmetic processing such as an extracting process of the bus voltage fluctuation components due to the output fluctuation of the renewable energy power generation to be described later.

Figure 2:
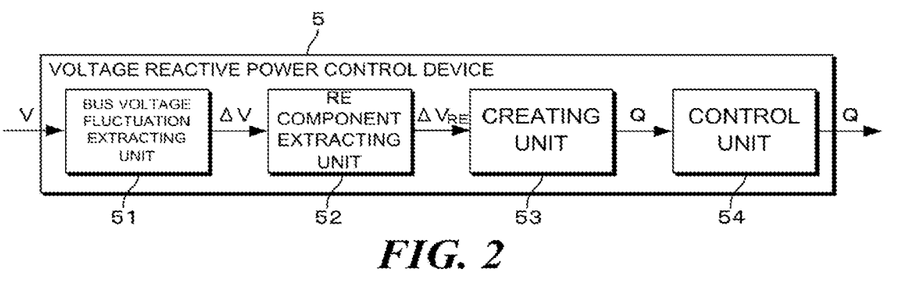
FIG. 2 is a functional block diagram of the voltage reactive power control device according to the first embodiment.

More specifically, as illustrated in FIG. 2, the voltage reactive power control device 5 includes a bus voltage fluctuation extracting unit 51, an RE component extracting unit 52, a creating unit 53, and a control unit 54.

The bus voltage fluctuation extracting unit 51 extracts a bus voltage fluctuation from the measured voltage of the secondary-side bus 12, and can perform extraction by conventionally well-known schemes. In this example, the bus voltage fluctuation extracting unit 51 is a band-pass filter. As for the measured voltage of the secondary-side bus 12, for example, the input of the measured value from a voltage measuring device provided at the secondary-side bus 12 via wired or wireless communication means is received. The bus voltage fluctuation extracting unit 51 may acquire the measured voltages measured at different times from the voltage measuring device provided at the secondary-side bus 12, and may obtain the bus voltage fluctuation from the difference between the measured voltages, and such a scheme is also included in the extraction of the bus voltage fluctuation from the measured bus voltage.

The RE component extracting unit 52 extracts a fluctuation component due to the output fluctuation of the renewable energy power generations (RE) from bus voltage fluctuation acquired by the bus voltage fluctuation extracting unit 51. This RE component extracting unit 52 eliminates, from the bus voltage fluctuation acquired by the bus voltage fluctuation extracting unit 51, the fluctuation components other than the fluctuation component due to the output fluctuation of the renewable energy power generations (RE), and takes the remaining bus voltage fluctuation component as the fluctuation component due to the output fluctuation of the renewable energy power generations (RE).

That is, as indicated by the following formula 1, the RE component extracting unit 52 acquires a bus voltage fluctuation component $\Delta V_{RE}$ due to the RE by eliminating, from a bus voltage fluctuation $\Delta V$ acquired by the bus voltage fluctuation extracting unit 51, a fluctuation component $\Delta V_{TAP}$ due to a tap control on the transformer 13, a fluctuation component $\Delta V_{CNT}$ due to an operation of the phase adjusting facilities 3, a fluctuation component $\Delta V_D$ due to a load change in the power distribution system, a fluctuation component $\Delta V_T$ due to a demand-and-supply change by the higher system, and a fluctuation component $\Delta V_B$ due to a control on the battery system.

(Formula 1)

$$\Delta V_{RE} = \Delta V - (\Delta V_{TAP} + \Delta V_{CNT} + \Delta V_D + \Delta V_T + \Delta V_B) \quad (1)$$

Figure 3:
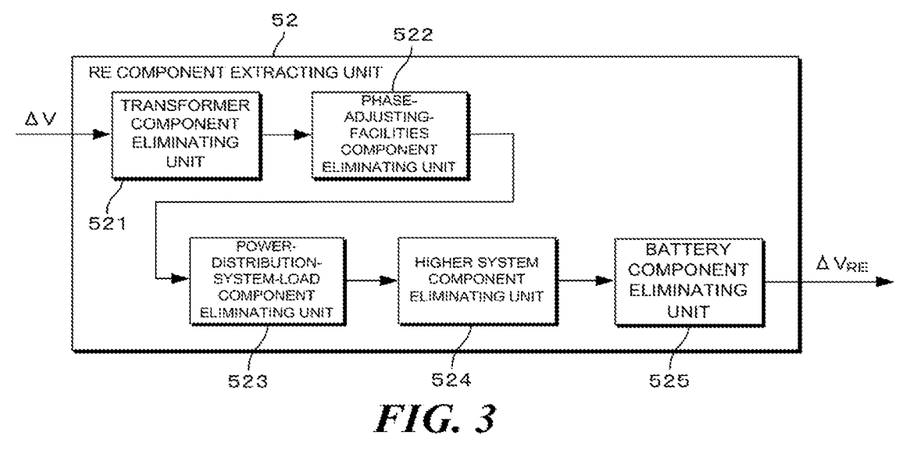
FIG. 3 is a functional block diagram of an RE component extracting unit.

More specifically, as illustrated in FIG. 3, the RE component extracting unit 52 includes a transformer component eliminating unit 521, a phase-adjusting-facilities component eliminating unit 522, a power-distribution-system-load component eliminating unit 523, a higher-system component eliminating unit 524, and a battery component eliminating unit 525.

The transformer component eliminating unit 521 eliminates the bus voltage fluctuation component due to the tap control on the transformer 13 from the input bus voltage fluctuation. The phase-adjusting-facilities component eliminating unit 522 eliminates the bus voltage fluctuation component due to the operation of the phase adjusting facilities 3 from the input bus voltage fluctuation. The power-distribution-system-load component eliminating unit 523 eliminates the bus voltage fluctuation component due to the load change in the power distribution system 2 from the input bus voltage fluctuation. The higher-system component eliminating unit 524 eliminates the bus voltage fluctuation component due to the demand-and-supply change of the higher system from the input bus voltage fluctuation. The battery component eliminating unit 525 eliminates the bus voltage fluctuation component due to the control on the battery system 4 from the input bus voltage fluctuation.

In the RE component extracting unit 52, the elimination sequence of the fluctuation components is not particularly limited. Moreover, the term "input bus voltage fluctuation" in each eliminating unit 521 to 525 is the bus voltage fluctuation acquired by the bus voltage fluctuation extracting unit 51 or the bus voltage fluctuation from which the fluctuation before each eliminating unit 521 to 525 has been eliminated.

For example, as illustrated in FIG. 3, when the RE component extracting unit 52 eliminates each of the fluctuation components in the sequence of the eliminating units 521 to 525, the bus voltage fluctuation input to each eliminating unit 521 to 525 is as follows.

(Step 1) Bus voltage fluctuation input to the transformer component eliminating unit 521: $\Delta V$ (Step 2) Bus voltage fluctuation input to the phase-adjusting-facilities component eliminating unit 522: $\Delta V - \Delta V_{Tap}$ (Step 3) Bus voltage fluctuation input to the power-distribution-system-load component eliminating unit 523: $\Delta V - \Delta V_{TAP} - \Delta V_{CNT}$ (Step 4) Bus voltage fluctuation input to the higher-system component eliminating unit 524: $\Delta V - \Delta V_{TAP} - \Delta V_{CNT} - \Delta V_D$ (Step 5) Bus voltage fluctuation input to the battery component eliminating unit 525: $\Delta V - \Delta_{TAP} - \Delta V_{CNT} - \Delta V_D - \Delta V_T$ The elimination schemes for the fluctuation components by the respective eliminating units 521 to 525 will be described. Since the fluctuation component $\Delta V_{TAP}$ due to the tap control on the transformer 13, the fluctuation component $\Delta V_{CNT}$ due to the operation of the phase adjusting facilities 3, the fluctuation component $\Delta V_D$ due to the load change in the power distribution system 2, the fluctuation component $\Delta V_T$ due to the demand-and-supply change by the higher system, and the fluctuation component $\Delta V_B$ due to the control on the battery system 4 have different frequency bands from that of the bus voltage fluctuation component due to various other fluctuations when frequency analysis is executed on the bus voltage fluctuation $\Delta V$, each of the eliminating units 521 to 525 eliminates, for example, from the input bus voltage fluctuation, the bus voltage fluctuation components in the frequency bands unique to the fluctuation components to be input to each of the eliminating units 521 to 525.

That is, the frequency bands unique to the fluctuation components to be to be input to each of the eliminating units 521 to 525 are stored in advance in an unillustrated recording medium, and each eliminating unit 521 to 525 acquires own unique frequency bands from said recording medium, and executes the process of eliminating the component in the frequency band same as said frequency band from the input bus voltage fluctuation.

In addition, since the fluctuation component $\Delta V_D$ due to the load change in the power distribution system and the fluctuation component $\Delta V_T$ due to the demand-and-supply change by the higher system are generally small, the power-distribution-system-load component eliminating unit 523 may determine the fluctuation component that is equal to or smaller than a predetermined threshold in the bus voltage fluctuation $\Delta V$ as $\Delta V_D$, and may eliminate this component. Moreover, the higher-system component eliminating unit 524 may determine the fluctuation component that is equal to or smaller than a predetermined threshold in the bus fluctuation $\Delta V$ as $\Delta V_T$, and may eliminate this component.

The threshold for the power-distribution-system load change and the threshold for the higher system can be designed and changed as appropriate in view of a system status, a circuit structure, etc. The large-small relation of these thresholds may change when, for example, a city where the power distribution system is located develops, and when a power generation plant and a transformer station are additionally installed in the higher system. Moreover, each of the eliminating units 523 and 524 may determine the fluctuation component that is equal to or smaller than the predetermined threshold in the input bus voltage fluctuation as $\Delta V_D$ and $\Delta V_T$, and may eliminate these components.

Figure 4:
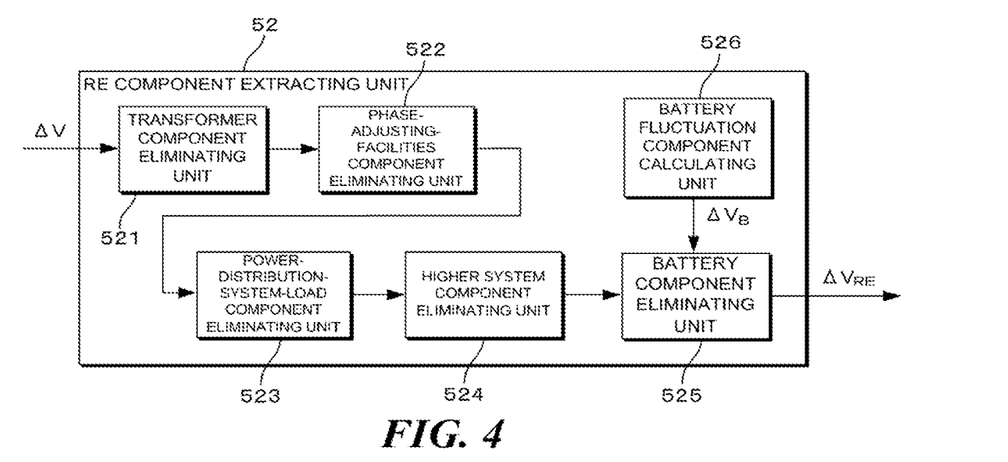
FIG. 4 is a functional block diagram of the RE component extracting unit according to a modified example.

Furthermore, the fluctuation component $\Delta V_B$ by the control on the battery system 4 may be acquired as follows and be eliminated. That is, as illustrated in FIG. 4, the RE component extracting unit 52 may include a battery fluctuation component calculating unit 526 that calculates the bus voltage fluctuation component $\Delta V_B$ due to the control on the battery system 4 based on a system constant, and the battery component eliminating unit 525 may eliminate the fluctuation component $\Delta V_B$ calculated by the battery fluctuation component calculating unit 526 from the bus bar voltage fluctuation. The system constant is a constant defined in accordance with the installation location of the battery system 4, the system interconnection status between the bus, etc., and is, for example, an impedance. The fluctuation component $\Delta V_B$ due to the control on the battery system 4 is, for example, $\Delta V_B = K \times Q$, when the system constant is K and the reactive power output by the battery system 4 is Q, but the present disclosure is not limited to this case.

The creating unit 53 creates a reactive power command value Q for suppressing the fluctuation based on the bus voltage fluctuation due to the renewable energy power generations extracted by the RE component extracting unit 52. The reactive power command value Q is created based on the following formula 2.

(Formula 2)

$$Q = Q_{before} + K_Q \times \Delta V_{RE} \qquad (2)$$

In this case, $Q_{before}$ is the reactive power command value created immediately before. $K_Q$ is a system constant that indicates the fluctuation of the reactive power command value relative to the voltage fluctuation of the bus, and increases as the number of power transmission lines gathered to the secondary-side bus 12 to which the battery system 4 is connected increases. Depending on the structure of the power transmission system, $K_Q$ is, for example, 10 to 15 Mvar/kV. Moreover, it is clear from the formula 2 that a fluctuation amount of the reactive power command value $\Delta Q$ ($= Q - Q_{before}$) satisfies a relation of $\Delta Q = K_Q \times \Delta V_{RE}$. The reactive power command value Q may be created with a control constant such as a primary delay constant and a gain being considered.

The control unit 54 executes reactive power control on the battery system 4 based on the reactive power command value Q created by the creating unit 53. More specifically, said command value Q is output to the AC and DC converter of the battery system 4 to control the reactive power output by the battery system 4 to become close to the command value Q. The control by the control unit 54 is, for example, a P control, a PI control, or a PID control.

[1-2. Action and Effect]

(1) The voltage reactive power control device 5 according to this embodiment is the voltage reactive power control device 5 that suppresses fluctuation of a voltage of the secondary-side bus 12 of the power distribution transformer station 1 to which the power distribution system 2 including a renewable energy power generation and the battery system 4 are connected, and includes the bus voltage fluctuation extracting unit 51 that extracts the bus voltage fluctuation $\Delta V$ from the voltage of the secondary-side bus 12, the RE component extracting unit 52 that extracts the fluctuation component $\Delta V_{RE}$ due to the renewable energy power generation from the bus voltage fluctuation $\Delta V$, the creating unit 53 that creates the reactive power command value Q for suppressing the fluctuation component $\Delta V_{RE}$ based on the bus voltage fluctuation component $\Delta V_{RE}$ due to the renewable energy power generation extracted by the RE component extracting unit 52, and the control unit 54 that executes the reactive power control on the battery system 4 based on the reactive power command value Q. The RE component extracting unit 52 extracts the fluctuation component due to the renewable energy power generation by eliminating the fluctuation components other than the fluctuation component $\Delta V_{RE}$ due to the renewable energy power generation from the bus voltage fluctuation $\Delta V$.

This enables a suppression of the bus voltage fluctuation due to the output fluctuation of renewable energy power generation cooperatively with the reactive power control by already-existing facilities by a simple structure without utilizing a measured output value of the renewable energy power generation.

That is, even if the power distribution system includes a plurality of renewable energy power generations, since the respective individual output fluctuations thereof are collected in the form of the bus voltage fluctuation $\Delta V$, the bus voltage fluctuation due to the output fluctuation of the renewable energy power generations is extracted by an elimination of fluctuation components other than the fluctuation due to the renewable energy power generation, and the reactive power control is executed on the battery system based on the extracted fluctuation, it becomes unnecessary to individually monitor the output fluctuation of the renewable energy power generation distributed in the power distribution system and execute the individual reactive power control, and the bus voltage fluctuation due to the output fluctuation of the renewable energy power generation can be suppressed by a simple structure.

Moreover, since the fluctuation components other than the fluctuation component $\Delta V_{RE}$ due to the renewable energy power generation are eliminated from the bus voltage fluctuation $\Delta V$, reactive power control can be cooperatively executed without interfering the reactive power control by already-existing facilities which attempts to suppress the bas voltage fluctuation due to the load change in the power distribution system 2 included in the eliminated component.

(2) The RE component extracting unit 52 includes the transformer component eliminating unit 521 that eliminates the bus voltage fluctuation component $\Delta V_{TAP}$ due to the tap control on the transformer 13 provided in the power distribution transformer station 1 from the input bus voltage fluctuation, the phase-adjusting-facilities component eliminating unit 522 that eliminates the bus voltage fluctuation component $\Delta V_{CNT}$ due to the operation of the phase adjusting facilities 3 provided in the power distribution transformer station 1 from the input bus voltage fluctuation, the power-distribution-system-load component eliminating unit 523 that eliminates the bus voltage fluctuation component $\Delta V_D$ due to the load change in the power distribution system 2 from the input bus voltage fluctuation, the higher-system component eliminating unit 524 that eliminates the bus voltage fluctuation component $\Delta V_T$ due to the demand-and-supply change of the higher-system connected to the power distribution transformer station 1 from the input bus voltage fluctuation, and the battery component eliminating unit 525 that eliminates the bus voltage fluctuation component $\Delta V_B$ due to the control on the battery system 4 from the input bus voltage fluctuation.

That is, according to this embodiment, the fluctuation components other than the fluctuation component due to the renewable energy power generations are defined as the fluctuation component $\Delta V_{TAP}$ due to the tap control on the transformer 13, the fluctuation component $\Delta V_{CNT}$ due to the operation of the phase adjusting facilities 3, the fluctuation component $\Delta V_D$ due to the load change in the power distribution system, the fluctuation component $\Delta V_T$ due to the demand-and-supply change in higher-system, and the fluctuation component $\Delta V_B$ due to the control on the battery system 4, and are eliminated from the bus voltage fluctuation $\Delta V$.

Hence, since this embodiment is subjected to the suppression of the bus voltage fluctuation due to the output fluctuation of the renewable energy power generation, the reactive power control of the already-existing transformer 13 and the already-existing phase adjusting facilities 3 conventionally installed in the power distribution transformer station 1 can be can be used as they are without changes, and the bus voltage fluctuation can be suppressed cooperatively without interfering the reactive power control by already-existing facilities.

(3) The transformer component eliminating unit 521, the phase-adjusting-facilities component eliminating unit 522, the power-distribution-system-load component eliminating unit 523, the higher-system component eliminating unit 524, or the battery component eliminating unit 525 eliminates the bus voltage fluctuation in the frequency band unique to the fluctuation component to be subjected by each of the eliminating unit. This enables an elimination of the fluctuation components $\Delta V_{TAP}$, $\Delta V_{CNT}$, $\Delta V_D$, $\Delta V_T$, or $\Delta V_B$ from the bus voltage fluctuation $\Delta$, enabling an extraction of the bus voltage fluctuation component due to the output fluctuation of the renewable energy power generations.

(4) The power-distribution-system-load component eliminating unit 523 eliminates the fluctuation component that is equal to or smaller than the predetermined threshold as the bus voltage fluctuation component $\Delta V_D$ due to the load change in the power distribution system 2 in the bus voltage fluctuation $\Delta V$ extracted by the bus voltage fluctuation extracting unit 51. Accordingly, since the bus voltage fluctuation $\Delta V_D$ due to the load change in the power distribution system 2 is generally small, by taking the fluctuation that is equal to or smaller than the predetermined threshold as the bus voltage fluctuation component $\Delta V_D$ due to the load change in the power distribution system 2, it becomes unnecessary to eliminate the component in the frequency band unique to the bus voltage fluctuation due to the load change in the power distribution system 2, and the device structure can be simplified.

(5) The higher-system component eliminating unit 524 eliminates the fluctuation component that is equal to or smaller than the predetermined threshold as the bus voltage fluctuation component $\Delta V_T$ due to the demand-and-supply change in the higher-system in the bus voltage fluctuation $\Delta V$ extracted by the bus voltage fluctuation extracting unit 51. Accordingly, since the bus fluctuation due to the load change in the power distribution system is generally small, by taking the fluctuation that is equal to or smaller than the predetermined threshold as the bus voltage fluctuation component $\Delta V_T$ due to the demand-and-supply change in the higher-system, it becomes unnecessary to eliminate the component in the frequency band unique to the bus voltage fluctuation due to the demand-and-supply change in the higher-system, and the device structure can be simplified.

(6) The RE component extracting unit 52 includes the battery fluctuation component calculating unit 526 that calculates the bus voltage fluctuation component $\Delta V_B$ due to the control on the battery system 4 based on the system constant, and the battery component eliminating unit 525 eliminates the fluctuation component calculated by the battery fluctuation component calculating unit 526 from the input bus voltage fluctuation. This enables an estimation of the bus voltage fluctuation component $\Delta V_B$ due to the control on the battery system 4, and said estimated value can be eliminated as the fluctuation due to the control on the battery system 4.

2. Second Embodiment

[2-1. Structure]

A second embodiment will be described with reference to FIGS. 5 and 6. The second embodiment employs the same basic structure as that of the first embodiment. In the following description, only the difference from the first embodiment will be described, the reference numeral will be given to the same component as that of the first embodiment, and the detailed description thereof will be omitted.

Figure 5:
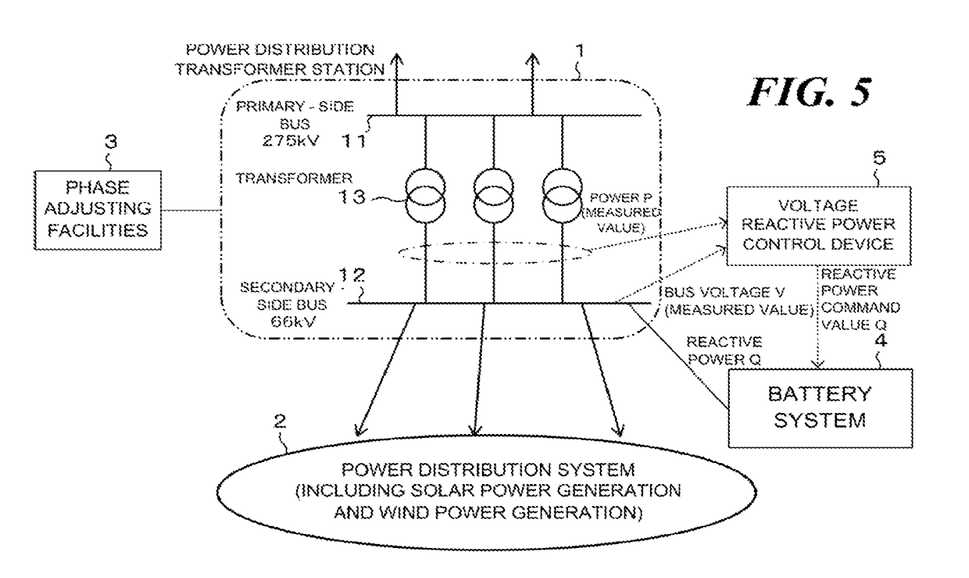
FIG. 5 is a structural diagram of an entire voltage reactive power control system to which a voltage reactive power control device according to a second embodiment is applied.

FIG. 5 is a structural diagram of an entire voltage reactive power control system to which the voltage reactive power control device 5 according to the second embodiment is applied. FIG. 6 is a functional block diagram of the voltage reactive power control device 5 according the second embodiment. The voltage reactive power control device 5 according to this embodiment determines whether $\Delta V_{RE}$ extracted by the RE component extracting unit 52 is proper or not in view of the presence and absence of the power fluctuation due to the RE component in the power distribution transformer station 1.

Figure 6:
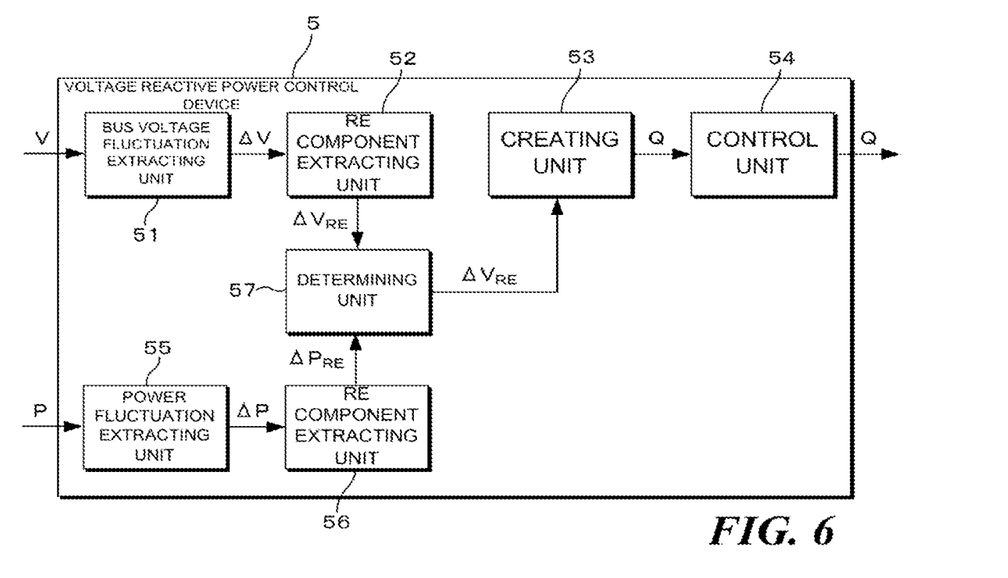
FIG. 6 is a functional block diagram of the voltage reactive power control device according to the second embodiment.

More specifically, as illustrated in FIG. 6, the voltage reactive power control device 5 according to this embodiment further includes a power fluctuation extracting unit 55, an RE component extracting unit 56, and a determining unit 57.

The power fluctuation extracting unit 55 extract a power fluctuation $\Delta P$ from a power P in the power distribution transformer station 1, and can perform extraction by a well-known scheme. In this example, the power fluctuation extracting unit 55 is a band-pass filter. As illustrated in FIG. 5, the power P is a total power that has passed through the transformers 13, and is a collection of powers measured by power meters provided at a lower side of each transformer 13. This collection may be executed by the voltage reactive power control device 5. Moreover, the power fluctuation extracting unit 55 may acquire the power P of different times, and may acquire the power fluctuation $\Delta P$ from the difference therebetween, and said scheme is also included in the extraction of the power fluctuation $\Delta P$ from the power P in the power distribution transformer station 1.

The RE component extracting unit 56 extracts a fluctuation component $\Delta P_{RE}$ due to the output fluctuation of the renewable energy power generations from the power fluctuation $\Delta P$ acquired by the power fluctuation extracting unit 55. The RE component extracting unit 56 extracts $\Delta P_{RE}$ by utilizing the fluctuation characteristic unique to the fluctuation component due to the output fluctuation of the renewable energy power generations. As for such a fluctuation characteristic, the speed of fluctuation, the length of a fluctuation cycle, etc., are applicable. Moreover, the RE component extracting unit 56 may extract the frequency band unique to the fluctuation component due to the output fluctuation of the renewable energy power generations.

The determining unit 57 receives $\Delta P_{RE}$ input from the RE component extracting unit 56, and receives $\Delta V_{RE}$ input from the RE component extracting unit 52. Next, the determining unit 57 determines whether the bus voltage fluctuation component $\Delta V_{RE}$ due to the output fluctuation of the renewable energy power generations is proper or not based on the magnitude $|\Delta P_{RE}|$ of the power fluctuation component $\Delta P_{RE}$ due to the output fluctuation of the renewable energy power generations.

More specifically, the determining unit 57 acquires the magnitude $|\Delta P_{RE}|$ of the power fluctuation component $\Delta P_{RE}$, determines whether such a magnitude $|\Delta P_{RE}|$ is equal to or smaller than a predetermined threshold or not, and when it is determined that such a magnitude is equal to or smaller than the predetermined threshold, the determining unit 57 determines as improper, sets the bus voltage fluctuation $\Delta V_{RE}$ due to the output fluctuation of the renewable energy power generations input from the RE component extracting unit 52 to be zero, and outputs the set value to the creating unit 53. For example, when $|\Delta P_{RE}|$ is equal to or smaller than the predetermined threshold, and $\Delta V_{RE}$ is left ($\Delta V_{RE} \neq 0$), this indicates that the fluctuation components other than the bus voltage fluctuation component due to the output fluctuation of the renewable energy power generation have not been sufficiently eliminated, and $\Delta_{RE}$ is set to be zero.

In contrast, when the determining unit 57 determines that the magnitude of $\Delta P_{RE}$ exceeds the predetermined threshold, since a determination that $\Delta V_{RE}$ is contained in the bus voltage fluctuation $\Delta V$, and the fluctuation components other than $\Delta V_{RE}$ have been sufficiently eliminated can be made, the determining unit 57 determines as proper, and directly outputs $\Delta V_{RE}$ to the creating unit 53. The subsequent control is consistent with that of the first embodiment, and thus the description will be omitted.

[2-2. Action and Effect]

The voltage reactive power control device 5 according to this embodiment includes the power fluctuation extracting unit 55 that extracts the power fluctuation $\Delta P$ from the power P in the power distribution transformer station 1, the RE component extracting unit 56 that extracts the fluctuation component $\Delta P_{RE}$ due to the renewable energy power generation from the power fluctuation $\Delta P$, and the determining unit 57 that determines whether the bus voltage fluctuation $\Delta V_{RE}$ due to the output fluctuation of the renewable energy power generation extracted by the RE component extracting unit 52 is proper or not based on the magnitude $|\Delta P_{RE}|$ of the fluctuation component extracted by the RE component extracting unit 56, and when determining that the magnitude $|\Delta P_{RE}|$ of the fluctuation component extracted by the RE component extracting unit 56 is equal to or smaller than the predetermined threshold and is improper, the determining unit 57 sets the bus voltage fluctuation $\Delta V_{RE}$ due to the output fluctuation of the renewable energy power generation to be zero, and outputs the set value to the creating unit 53.

This prevents the reactive power control based on the false $\Delta V_{RE}$. That is, since the RE component extracting unit 52 employs a scheme of acquiring the fluctuation $\Delta V_{RE}$ by the RE component by eliminating the fluctuation components other than the fluctuation component due to the RE from the bus voltage fluctuation $\Delta V$, even if the fluctuation components other than the RE fluctuation component are not sufficiently eliminated, it can be confirmed whether $\Delta V_{RE}$ acquired by the RE component extracting unit 52 is proper or not based on whether $|\Delta P_{RE}|$ is equal to or smaller than the predetermined threshold or not. Hence, when it is determined that $\Delta V_{RE}$ acquired by the RE component extracting unit 52 is improper, $\Delta V_{RE}$ acquired by the RE component extracting unit 52 is set to be zero and output to the creating unit 53, preventing the creating unit 53 and the control unit 54 from executing the reactive power control based on the false $\Delta V_{RE}$.

3. Other Embodiments

Although several embodiments of the present disclosure have been described in this specification, these embodiments are merely presented as examples and are not intended to limit the scope of the present disclosure. The above embodiments can be carried out in other various forms, and various omissions, replacements, and modifications can be made thereto without departing from the scope of the present disclosure. Such embodiments and modified forms thereof are within the scope and spirit of the present disclosure, and also within the scope of the invention as recited in the appended claims and the equivalent range thereto.

For example, in the first embodiment, the power-distribution-system-load component eliminating unit 523 and the higher-system component eliminating unit 524 eliminate the fluctuation that is equal to or smaller than the predetermined thresholds as the fluctuation component due to the load of the power distribution system and as the fluctuation due to the elimination by the higher-system in the bus voltage fluctuation $\Delta V$, and such a range may be set as dead bands.

Moreover, in the second embodiment, when determining that $\Delta V_{RE}$ is improper, the determining unit 57 outputs $\Delta V_{RE}$ that is set to be zero to the creating unit 53, but the RE component extracting unit 52 may set the extracted $\Delta V_{RE}$ to be zero, and output to the creating unit 53, upon receiving the determination result by the determining unit 57 that is improper, and. Moreover, after the RE component extracting unit 52 outputs $\Delta V_{RE}$ to the creating unit 53, the creating unit 53 may wait for the determination result of the determining unit 57, and then create the reactive power command value Q. More specifically, when receiving a signal indicating that the determination result by the determining unit 57 is improper, the creating unit 53 may set $\Delta V_{RE}$ input from the RE component extracting unit 52 to be zero, and when receiving the signal indicating that the determination result by the determining unit 57 is proper, the creating unit may create the reactive power command value Q based on the input $\Delta V_{RE}$.

REFERENCE SIGNS LIST

1 Power distribution transformer station
11 Primary-side bus
12 Secondary-side bus
13 Transformer
2 Power distribution system
3 Phase adjusting facilities
4 Battery systems
5 Voltage reactive power control device
51 Bus voltage fluctuation extracting unit
52 RE component extracting unit
521 Transformer component eliminating unit
522 Phase-adjusting-facilities component eliminating unit
523 Power-distribution-system-load component eliminating unit
524 Higher-system component eliminating unit
525 Battery component eliminating unit
526 Battery fluctuation component calculating unit
53 Creating unit 54 Control unit
55 Power fluctuation extracting unit
56 RE component extracting unit
57 Determining unit

The invention claimed is:

1. A voltage reactive power control device that suppresses a fluctuation of a bus voltage of a power distribution transformer station to which a power distribution system including a renewable energy power generation, and a battery system are connected, the voltage reactive power control device comprising:
   a first extracting unit that extracts an input bus voltage fluctuation from the bus voltage;
   a second extracting unit that extracts a fluctuation component due to the renewable energy power generation from the input bus voltage fluctuation;
   a creating unit that creates a reactive power command value for suppressing the fluctuation based on the fluctuation component due to the renewable energy power generation extracted by the second extracting unit; and
   a control unit that executes a reactive power control on the battery system based on the reactive power command value,
   wherein:
   the second extracting unit extracts the fluctuation component due to the renewable energy power generation by eliminating fluctuation components other than the fluctuation component due to the renewable energy power generation from the input bus voltage fluctuation, and
   the second extracting unit comprises:
      a transformer component eliminating unit that eliminates a bus voltage fluctuation component due to a tap control on a transformer provided in the power distribution transformer station from the input bus voltage fluctuation;
      a phase-adjusting-facilities component eliminating unit that eliminates a bus voltage fluctuation component due to an operation of phase adjusting facilities provided in the power distribution transformer station from the input bus voltage fluctuation;
      a power-distribution-system-load component eliminating unit that eliminates a bus voltage fluctuation component due to a load change in the power distribution system from the input bus voltage fluctuation;
      a higher-system component eliminating unit that eliminates a bus voltage fluctuation component due to a demand-and-supply change of a higher-system connected to the power distribution transformer station from the input bus voltage fluctuation; and
      a battery component eliminating unit that eliminates a bus voltage fluctuation component due to a control on the battery system from the input bus voltage fluctuation.

2. The voltage reactive power control device according to claim 1, wherein the transformer component eliminating unit, the phase-adjusting-facilities component eliminating unit, the power-distribution-system-load component eliminating unit, the higher-system component eliminating unit, or the battery component eliminating unit eliminates the input bus voltage fluctuation in a frequency band unique to the fluctuation component to be subjected by each of the eliminating units.

3. The voltage reactive power control device according to claim 1, wherein the power-distribution-system-load component eliminating unit eliminates the fluctuation component that is equal to or smaller than a predetermined threshold as the fluctuation component due to the load change in the power distribution system in the input bus voltage fluctuation extracted by the first extracting unit.

4. The voltage reactive power control device according to claim 1, wherein the higher-system component eliminating unit eliminates the fluctuation component that is equal to or smaller than a predetermined threshold as the fluctuation component due to the demand-and-supply change in the higher-system in the input bus voltage fluctuation extracted by the first extracting unit.

5. The voltage reactive power control device according to claim 1, wherein the second extracting unit comprises a battery fluctuation component calculating unit that calculates the fluctuation component due to the control on the battery system based on a system constant,
   wherein the battery component eliminating unit eliminates the fluctuation component calculated by the battery fluctuation component calculating unit from the input bus voltage fluctuation.

6. A voltage reactive power control device that suppresses a fluctuation of a bus voltage of a power distribution transformer station to which a power distribution system including a renewable energy power generation, and a battery system are connected, the voltage reactive power control device comprising:
   a first extracting unit that extracts an input bus voltage fluctuation from the bus voltage;
   a second extracting unit that extracts a fluctuation component due to the renewable energy power generation from the input bus voltage fluctuation;
   a creating unit that creates a reactive power command value for suppressing the fluctuation based on the fluctuation component due to the renewable energy power generation extracted by the second extracting unit;
   a control unit that executes a reactive power control on the battery system based on the reactive power command value;
   a third extracting unit that extracts a power fluctuation from power in the power distribution transformer station;
   a fourth extracting unit that extracts the α second fluctuation component due to the renewable energy power generation from the power fluctuation; and
   a determining unit that determines whether the input bus voltage fluctuation due to an output fluctuation of the renewable energy power generation extracted by the second extracting unit is proper or not based on a magnitude of the second fluctuation component extracted by the fourth extracting unit,
   wherein:
   the second extracting unit extracts the fluctuation component due to the renewable energy power generation by eliminating fluctuation components other than the fluctuation component due to the renewable energy power generation from the bus voltage fluctuation, and
   when determining that the magnitude of the second fluctuation component extracted by the fourth extracting unit is equal to or smaller than a predetermined threshold and is improper, the determining unit sets the input bus voltage fluctuation due to the output fluctuation of the renewable energy power generation to be zero, and outputs the fluctuation component to the creating unit.

7. A voltage reactive power control method to suppress a fluctuation of a bus voltage of a power distribution transformer station to which a power distribution system including a renewable energy power generation, and a battery system are connected, the voltage reactive power control method comprises:

a first extracting process of extracting an input bus voltage fluctuation from the bus voltage;

a second extracting process of extracting a fluctuation component due to the renewable energy power generation from the input bus voltage fluctuation;

a creating process of creating a reactive power command value for suppressing the fluctuation component based on the fluctuation component due to the renewable energy power generation extracted by the second extracting process; and a control process of executing a reactive power control on the battery system based on the reactive power command value, wherein the second extracting process comprises:

a transformer component eliminating process of eliminating a bus voltage fluctuation component due to a tap control on a transformer provided in the power distribution transformer station from the input bus voltage fluctuation;

a phase-adjusting-facilities component eliminating process of eliminating a bus voltage fluctuation component due to an operation of phase adjusting facilities provided in the power distribution transformer station from the input bus voltage fluctuation;

a power-distribution-system-load component eliminating process of eliminating a bus voltage fluctuation component due to a load change in the power distribution system from the input bus voltage fluctuation;

a higher-system component eliminating process of eliminating a bus voltage fluctuation component due to a demand-and-supply change of a higher-system connected to the power distribution transformer station from the input bus voltage fluctuation; and a battery component eliminating process of eliminating a bus voltage fluctuation component due to a control on the battery system from the input bus voltage fluctuation.

8. The voltage reactive power control method according to claim 7, wherein the transformer component eliminating process, the phase-adjusting-facilities component eliminating process, the power-distribution-system-load component eliminating process, the higher-system component eliminating process, or the battery component eliminating process eliminates the input bus voltage fluctuation in a frequency band unique to the fluctuation component to be subjected by each of the eliminating processes.

9. The voltage reactive power control method according to claim 7, wherein the power-distribution-system-load component eliminating process eliminates the fluctuation component that is equal to or smaller than a predetermined threshold as the fluctuation component due to the load change in the power distribution system in the input bus voltage fluctuation extracted by the first extracting process.

10. The voltage reactive power control method according to claim 7, wherein the higher-system component eliminating process eliminates the fluctuation component that is equal to or smaller than a predetermined threshold as the fluctuation component due to the demand-and-supply change in the higher-system in the input bus voltage fluctuation extracted by the first extracting process.

11. The voltage reactive power control method according to claim 7, wherein the second extracting process comprises a battery fluctuation component calculating process that calculates the fluctuation component due to the control on the battery system based on a system constant, wherein the battery component eliminating process eliminates the fluctuation component calculated by the battery fluctuation component calculating process from the input bus voltage fluctuation.

* * * * *